(12) United States Patent
Yi et al.

(10) Patent No.: US 8,971,873 B2
(45) Date of Patent: Mar. 3, 2015

(54) METHOD OF SELECTING WIRELESS BASE STATIONS

(75) Inventors: Ki Hak Yi, Detroit, MI (US); Sethu K. Madhavan, Erie, PA (US); James Doherty, Wyandotte, MI (US); Michael J. Blanck, Clarkston, MI (US)

(73) Assignee: General Motors LLC, Detroit, MI (US)

( * ) Notice: Subject to any disclaimer, the term of this patent is extended or adjusted under 35 U.S.C. 154(b) by 130 days.

(21) Appl. No.: 13/299,787

(22) Filed: Nov. 18, 2011

(65) Prior Publication Data
US 2013/0130675 A1 May 23, 2013

(51) Int. Cl.
*H04M 11/04* (2006.01)
*H04W 48/20* (2009.01)
*H04W 60/04* (2009.01)
*H04W 48/16* (2009.01)

(52) U.S. Cl.
CPC .............. *H04W 48/20* (2013.01); *H04W 60/04* (2013.01); *H04W 48/16* (2013.01)
USPC .......................................... 455/424; 455/417

(58) Field of Classification Search
USPC .................. 455/417, 424, 432, 1, 435, 2, 468
See application file for complete search history.

(56) References Cited

U.S. PATENT DOCUMENTS

| | | | |
|---|---|---|---|
| 7,991,381 B1* | 8/2011 | Dunne et al. | 455/404.1 |
| 8,270,967 B1* | 9/2012 | Goyal et al. | 455/432.1 |
| 2008/0046135 A1* | 2/2008 | Farrow | 701/2 |
| 2008/0055154 A1* | 3/2008 | Martucci et al. | 342/357.1 |
| 2010/0120373 A1* | 5/2010 | Wheatley et al. | 455/68 |
| 2010/0121524 A1* | 5/2010 | Wheatley | 701/35 |
| 2011/0230186 A1* | 9/2011 | Shinoda et al. | 455/432.1 |

* cited by examiner

*Primary Examiner* — Myron K Wyche
(74) *Attorney, Agent, or Firm* — Anthony Luke Simon; Reising Ethington P.C.

(57) ABSTRACT

A method of selecting a wireless carrier system using a vehicle telematics unit includes identifying the system identity of a first base station with which a vehicle telematics unit is presently registered; detecting the presence of a second base station having a different system identity using the vehicle telematics unit; determining that the system identity of the first base station is preferred by the vehicle telematics unit with respect to the system identity of the second base station; and registering the vehicle telematics unit with the second base station when the signal strength of the second base station is greater than the signal strength of the first base station.

12 Claims, 2 Drawing Sheets

METHOD OF SELECTING WIRELESS BASE STATIONS

TECHNICAL FIELD

The present invention relates generally to vehicles and more particularly to wireless communication with respect to wireless base stations.

BACKGROUND OF THE INVENTION

Wireless communications and the telephony infrastructure that accompanies such communications are becoming a more frequent presence in places where people live and work. The increasing presence of the infrastructure offers wireless devices a greater ability to send/receive voice and/or data communications. Examples of telephony infrastructure, such as that provided by a cellular communication system, include base stations or cellular towers each of which may be operated by different wireless service providers. The cellular communication system typically services wireless devices that move from one geographical area to another. As a wireless device moves between areas, the device may cease communicating with one base station and begin communicating with another base station. This process can be generally described as a "handoff." The wireless device often decides when such a handoff occurs. However, in some situations, wireless devices make inefficient decisions regarding when to maintain a connection with a base station and when to select a new base station.

SUMMARY OF THE INVENTION

According to an aspect of the invention, there is provided a method of selecting a wireless carrier system using a vehicle telematics unit. The method includes identifying the system identity of a first base station with which a vehicle telematics unit is presently registered; detecting the presence of a second base station having a different system identity using the vehicle telematics unit; determining that the system identity of the first base station is preferred by the vehicle telematics unit with respect to the system identity of the second base station; and registering the vehicle telematics unit with the second base station when the signal strength of the second base station is greater than the signal strength of the first base station.

According to another aspect of the invention, there is provided a method of selecting a wireless carrier system using a vehicle telematics unit. The method includes detecting that a forward link of a wireless connection from a vehicle telematics unit to a currently-used base station of a wireless carrier system is operational; determining that a reverse link of the wireless connection from the currently-used base station of the wireless carrier system to the vehicle telematics unit is not operational; identifying one or more base stations neighboring the vehicle telematics unit for communications in response to the detections; comparing a system identification number (SID) of the identified neighboring base station and a SID of the currently-used base station with a preferred roaming list; determining that the SID of the neighboring base station is less preferred than the SID of the currently-used base station using the preferred roaming list; overriding a preference of the vehicle telematics unit to maintain a registration with the currently-used base station based on the determination that the SID of the neighboring base station is less preferred; and registering the vehicle telematics unit with the neighboring base station.

According to yet another aspect of the invention, there is provided a method of selecting a wireless carrier system using a vehicle telematics unit. The method includes receiving a wireless signal at a vehicle telematics unit from a currently-used base station of a wireless carrier system that includes a geographical position of the currently-used base station; sending communications from the vehicle telematics unit to the currently-used base station using a reverse link of a wireless connection between the vehicle telematics unit and the currently-used base station; detecting a failure to receive a response to the sent communications at the vehicle telematics unit from the currently-used base station via a forward link of the wireless connection; determining the geographical position of a vehicle carrying the vehicle telematics unit using a GPS module located on the vehicle; comparing the determined geographical position of the vehicle with the geographical position of the currently-used base station; determining that the vehicle is located beyond a predetermined threshold distance from the currently-used base station; identifying one or more neighboring base stations; determining that the identified neighboring base station is less preferred than the currently-used base station; overriding a preference to maintain a registration with the currently-used base station; and registering the vehicle telematics unit with the identified neighboring base station.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENT(S)

Figure 1:
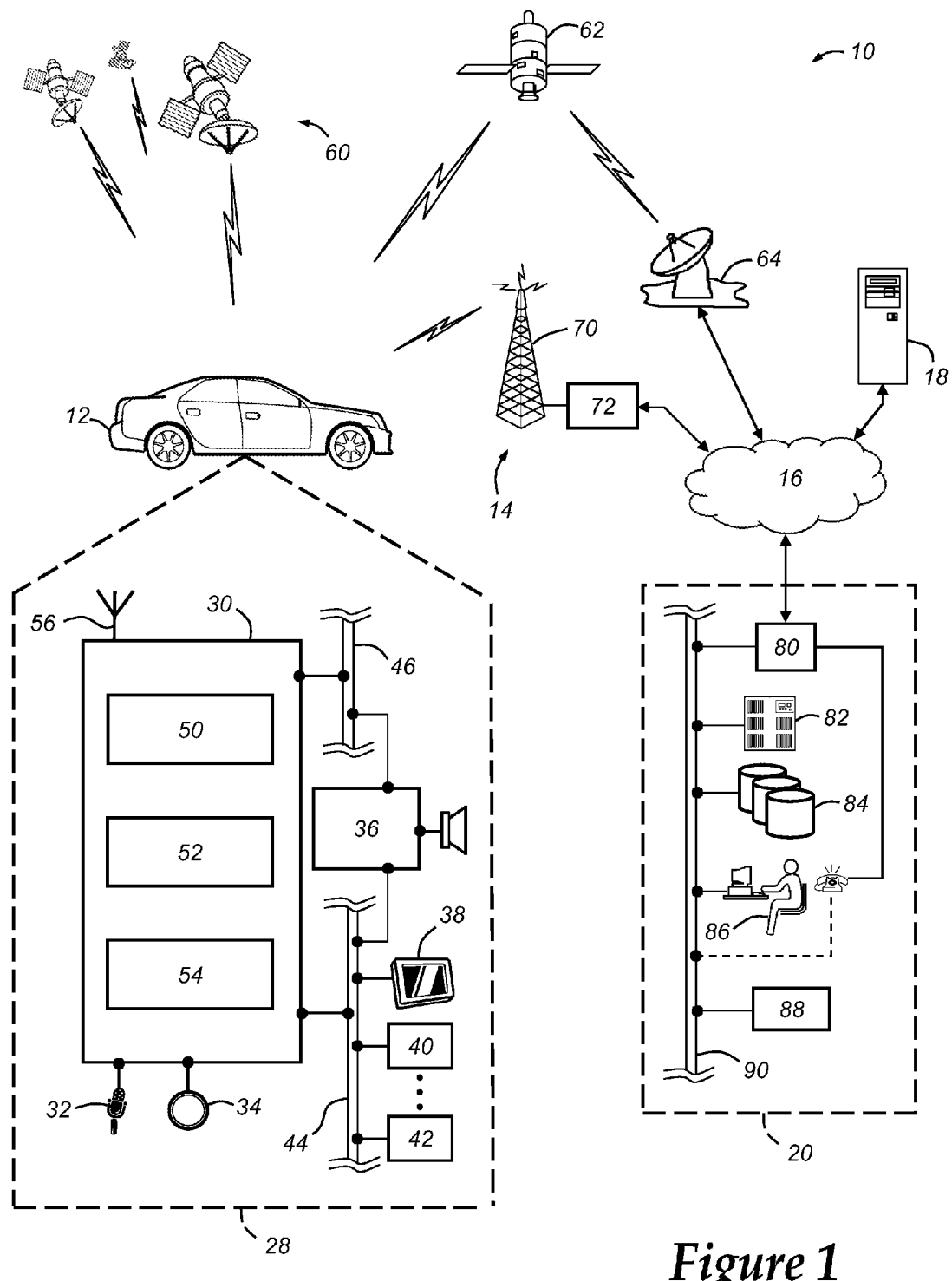
FIG. 1 is a block diagram depicting an exemplary embodiment of a communications system that is capable of utilizing the method disclosed herein.

The method described below optimizes the selection of base stations by vehicle telematics units. Presently, selection can be affected by the various technical attributes of vehicle telematics units and base stations. Base stations may be optimized for operation with handheld cellular phones, which may function differently than vehicle telematics units. For example, a typical vehicle telematics unit can use an antenna having a ~13-19 decibel (db) gain whereas handheld cellular phones can use antennas having a ~3 db antenna gain. This disparity may be caused, at least partially, by the placement of the vehicle telematics unit antenna on the roof of a vehicle. Given that cellular phones may be a more frequent user of cellular systems, base stations may be programmed to operate using the performance characteristics of the cellular phone. That is, a cellular system may operated with the expectation that a base station will lose contact with handsets beyond a range that is supported by a ~3 db antenna. In one example, this can be ~17 kilometers (km). In contrast, the vehicle telematics unit having a ~13-19 db antenna can have an effective range of ~59-79 km. And with the vehicle telematics unit's extended range, it can maintain a connection (e.g. "camped-on") a base station even though other base stations could provide better service, such as through a stronger signal or by being more proximate.

The increased power of the antenna used by the vehicle telematics unit can create an unbalanced or limited system between the vehicle telematics unit and the camped-on base station. In this case, a limited system can mean that the vehicle telematics unit receives communications from the base station thereby maintaining the forward link. But communications sent via the reverse link from the vehicle telematics unit to the base station may not be received. Because the base station may use a relatively powerful transmitter that is high off the ground, transmissions from the base station can be received at the vehicle telematics unit via its ~13-19 db antenna even though the vehicle telematics unit may be beyond a range within which it can successfully send communications to the base station. In other words, the vehicle telematics unit can misinterpret the reception of communications from a camped-on base station via the forward link as indicating that the base station is a valid selection even though the unit may be unable to effectively transmit communications to that base station via the reverse link.

The decision to maintain or end a connection with a base station can be influenced by a preferred roaming list (PRL) carried by the vehicle telematics unit. Preferences included with the PRL can prevent the vehicle telematics unit from ending its connection with the base station even though more effective base stations are available as a conduit for cellular communications. The PRL may contain a plurality of wireless carrier systems each of which is identified using a system identification number (SID) and/or a network identification number (NID). The PRL may be referenced when deciding to maintain or end the present base station connection based on the SIDs and/or NIDs it includes. For example, the vehicle telematics unit may travel toward a base station having a stronger signal than the base station it is currently camped on. When this occurs, the vehicle telematics unit may reference the PRL to determine if the unit can use the stronger signal. Even if the PRL identifies the stronger signal as one that can be used, the vehicle telematics unit might not use it unless the PRL classifies it as more preferred than the present signal.

The system and method described herein can instruct vehicle telematics units to identify and use optimal base stations and/or wireless carrier systems based on certain criteria or triggers and in the process avoid dragging on weak base stations and/or wireless carrier systems.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
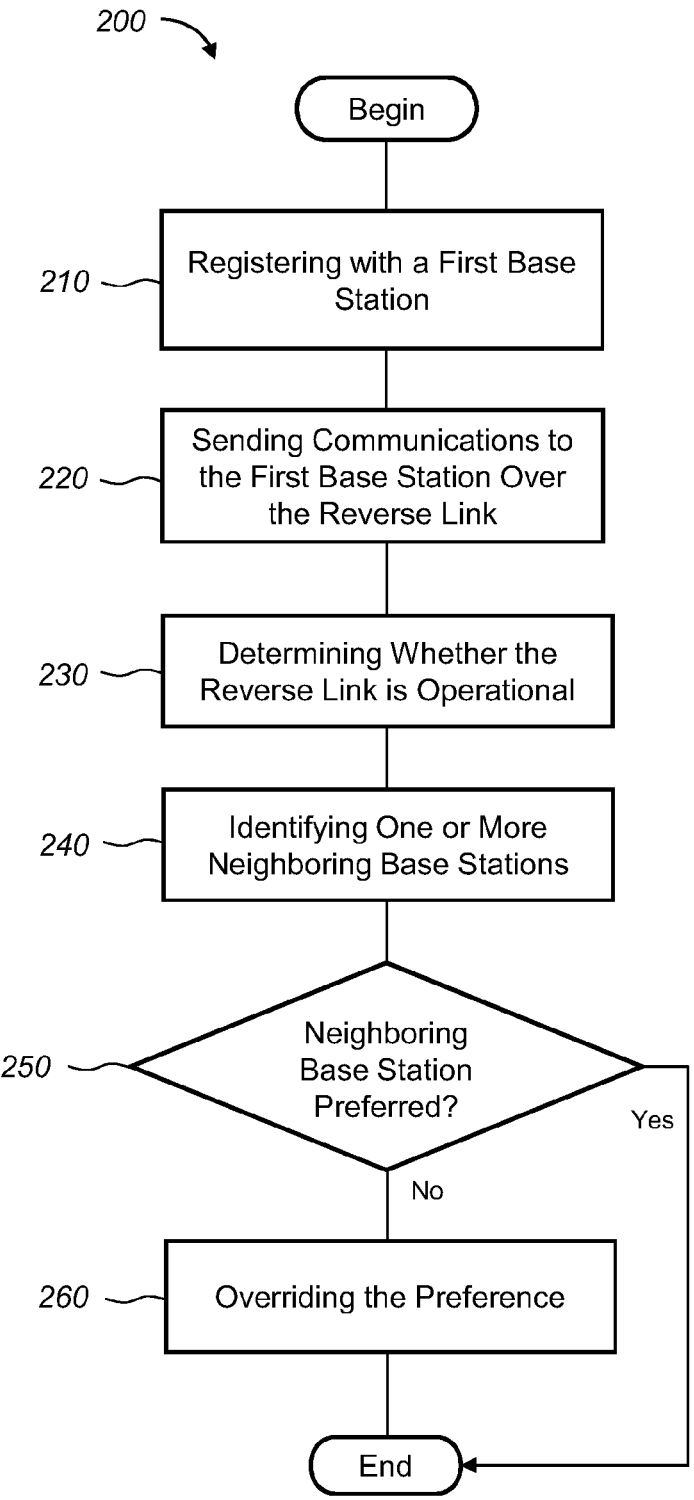
FIG. 2 is a flow chart of a method of selecting a wireless base station.

Turning now to FIG. 2, there is shown a method 200 of selecting a base station using the vehicle telematics unit 30. The method 200 begins by identifying the system identity of a first base station with which the vehicle telematics unit 30 is presently registered. This can be carried out when the vehicle telematics unit 30 registers with the first base station. Here and at other parts of this description the first base station may also be referred to as the currently-used base station. And registration with the currently-used base station can mean that the vehicle telematics unit 30 has selected that base station as one that the unit 30 is using to place and receive cellular calls or transmit/receive voices and/or data. The system identity of the base station can be determined using the system identification number (SID) that identifies the base station as being operated by a particular wireless carrier system 14. Apart from the SID, the identity of the base station can also be network identification numbers (NID) as well. This can involve receiving a wireless signal at the vehicle telematics unit 30 that can be transmitted from the currently-used base station. This wireless signal can be described as the forward link or forward channel between the currently-used base station and the vehicle telematics unit 30. As part of the forward link, the base station can communicate its identity to the vehicle telematics unit 30.

Once received, the vehicle telematics unit 30 can compare the communicated identity, such as the SID, with a source of usable base stations and/or wireless carrier systems 14. One example of the source is a preferred roaming list (PRL), which will be discussed in more detail below. In addition, the wireless signal can include other types of information, such as signal strength or location information. For instance, the vehicle telematics unit 30 can measure the received signal strength indication (RSSI) of the forward link from the base station. This measurement can indicate the power present in the forward link. The signal strength of the forward link can also be measured at the vehicle telematics unit 30 by calculating the strength of the received pilot energy ($E_c$) with respect to the total power spectral density ($I_o$). In addition, the base station can broadcast its location—in the form of latitude and longitude coordinates—via the forward link. In one implementation, the base station can be carried out using the cell tower 70 described above. The method 200 proceeds to step 220.

At step 220, communications are sent from the vehicle telematics unit 30 to the currently-used base station of the wireless carrier system 14 using a reverse link of a wireless connection between the vehicle telematics unit 30 and the base station. The reverse link can broadly be described as including wireless communications sent from the vehicle telematics unit 30 to the base station. After registering with the currently-used base station and establishing a wireless connection via the forward link, the vehicle telematics unit 30 can send information to the base station via the reverse link. This information varies and can include keeping the registration current as well as initiating a call from the vehicle telematics unit 30. The method 200 proceeds to step 230.

At step 230, it is determined whether the reverse link is operational. This can involve detecting a failure at the vehicle telematics unit 30 to receive a response to the communications sent via the forward link of the wireless connection. And the determination can be used to command the vehicle telematics unit 30 to search for another base station. Determining the functionality of the reverse link can be accomplished in one or more of the following ways. For instance, a registration attempt with the base station can be made via the reverse link. However, the vehicle telematics unit 30 may not receive a response to the registration attempt. Based on the lack of response, the vehicle telematics unit 30 may be able to determine that the reverse link is not operational. The lack of response can be described as system dragging, which can indicate that the vehicle telematics unit 30 is located beyond a range within which the unit 30 can successfully transmit wireless communications to the base station. Yet, the vehicle telematics unit 30 may nonetheless maintain a current registration with the base station.

To remedy system dragging, a dragged timer and/or a dragged counter can be used. The dragged timer can be implemented by activating a timer when the registration attempt is made. And if a predetermined amount of time passes before a response is received from the base station, the vehicle telematics unit 30 can determine that the base station failed to receive registration attempt sent by the vehicle telematics unit 30. In addition, the dragged counter can count how many times the vehicle telematics unit 30 has attempted to register with the base station and failed (e.g. the system dragged). Using the dragged timer, the dragged counter, or a combination of the two, a determination can be made with regard to the functionality of the reverse link.

Other ways of determining the functionality of the reverse link are possible. For example, the geographical position of the vehicle 12 can be determined and compared with the location of the currently-used base station. This can be at least partially carried out using the GPS module 40 located on the vehicle 12. The determined geographical position can be compared with the geographical position of the currently-used base station. If a comparison of the position of the vehicle 12 and the position of the base station determines that the distance between them exceeds a predetermined value, such as 15 km, the reverse link may not be functioning. In another example, one or more geofences may be used to periodically initiate a determination of whether the reverse link is functioning. A geofence can be a geographical area or linear distance limit the traversal of which can trigger the vehicle telematics unit 30 to determine that the reverse link is not functioning. For instance, a geofence can be an instruction stored at the vehicle telematics unit 30 to attempt registration with the base station after travelling 20 km. Each time the vehicle 12 travels a defined distance (in this case 20 km) the vehicle telematics unit 30 can be directed to attempt registration. If the vehicle telematics unit 30 fails to receive a response from the base station, the unit 30 can determine that the reverse link is not functioning.

It is also possible to alter the threshold of the dragged timer based on the speed of the vehicle 12. The vehicle telematics unit 30 can determine the speed of the vehicle 12 using the GPS module 40 or other similarly functioning device. The vehicle speed can be used as a factor to increase or decrease the threshold of the dragged timer so that the vehicle telematics unit 30 can be determine that the reverse link is not operational. As an example, the dragged timer can have a value of 100 chips before the threshold is met, the timer expires, and the vehicle telematics unit 30 can be directed to search for a new base station. The dragged timer can be used with a specific size area. For purposes of explanation, that size will be set at 100 chips thereby yielding an area of ~24.4 km (244 meters (m)*100 chips). If the vehicle 12 is travelling at 60 kilometers per hour (kmh), the threshold of the dragged timer can be established by dividing the yielded area (24.4 km) by the speed at which the vehicle 12 is travelling (60 kmh) to yield a threshold of 24.36 minutes. In contrast, if the vehicle 12 is travelling faster—at 100 kmh—the threshold can be reduced to 14.64 minutes (24.4 km/100 kmh).

While a number of tests have been described for testing the functionality of the reverse channel, it should be appreciated that each of these tests can be used alone to carry out step 230 or can be used in various combinations to do so. For instance, it can be determined that the reverse link is not functioning properly if a specific combination of RSSI and $E_c/I_o$ values are maintained for a predetermined amount of time. As an example, the reverse link may not be operating if the RSSI is <−100 db and $E_c/I_o$>7 for 60 seconds or more. Many other combinations are possible. The method 200 proceeds to step 240.

At step 240, one or more base stations surrounding the vehicle telematics unit 30 are identified. Once it has been determined that the reverse link is not functioning properly, the vehicle telematics unit 30 can identify one or more base stations neighboring the vehicle telematics unit 30. The vehicle telematics unit 30 can carry this out by scanning the immediate area for other base stations. As part of this scan, the vehicle telematics unit 30 can receive the SID of one or more neighboring base stations. The vehicle telematics unit 30 can select neighboring base stations when the signal strength of the identified neighboring base station is greater than that of the currently-used base station. In one example, the can be carried out by detecting the presence of base stations other than the one the vehicle telematics unit 30 is presently registered with. It is possible that the neighboring base stations have a different SID than the currently-used base station. The method 200 proceeds to step 250.

At step 250, it is determined that one or more of the base stations identified during step 240 are less preferred than the currently-used base station. Or that the currently-used base station is more preferred than the identified neighboring base station. This can be carried out by comparing the SID of an identified neighboring base station and the SID of the currently-used base station with the PRL. The vehicle telematics unit 30 can make base station selection choices based on instructions included with the PRL. The PRL can also direct the vehicle telematics unit 30 to make registration decisions based on a most-recently used (MRU) list. The PRL generally includes a hierarchical list of wireless carrier systems 14 that are available for service. The MRU can be described as including a list of the base stations and/or wireless carrier systems 14 that the vehicle telematics unit 30 has last accessed. If, according to the PRL, the SID of the identified neighboring base station is more preferred than the currently-used base station, then the vehicle telematics unit 30 can end its communications with the currently-used base station and begin communications with the identified neighboring base station. However, if the SID of the identified base station is not more preferred than the currently-used base station, a mechanism for overriding the preferences included with the PRL can be used. The method proceeds to step 260.

At step 260, a preference to maintain a registration with the currently-used base station is overridden and the vehicle telematics unit 30 is registered with the identifying neighboring base station. Based on the determination above that the reverse link is not functioning properly while the forward link is functioning, the vehicle telematics unit 30 can be programmed to bypass the use of the MRU to scan for neighboring base stations. Apart from the MRU bypass, a throttle timer can be used during which the vehicle telematics unit 30 can be directed to permit registration with base stations having less desirable SIDs before the throttle timer expires. The throttle timer can be set after determining that the identified neighboring base station have a SID that is lower priority than the SID of the currently-used base station(s). The length of throttle timer can be variable and in one example can be 1.5 times the duration of the dragged timer. When the throttle timer expires, the method 200 then ends.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of selecting a wireless carrier system using a vehicle telematics unit, comprising the steps of:
   (a) detecting that a forward link of a wireless connection from a vehicle telematics unit to a currently-used base station of a wireless carrier system is operational;
   (b) determining that a reverse link of the wireless connection from the currently-used base station of the wireless carrier system to the vehicle telematics unit is not operational using a dragged timer;
   (c) altering the duration of the dragged timer based on the speed of a vehicle carrying the vehicle telematics unit;
   (d) identifying one or more base stations neighboring the vehicle telematics unit for communications in response to the detections in steps (a)-(b);
   (e) comparing a system identification number (SID) of the identified neighboring base station and a SID of the currently-used base station with a preferred roaming list;
   (f) determining that the SID of the neighboring base station is less preferred than the SID of the currently-used base station using the preferred roaming list;
   (g) overriding a preference of the vehicle telematics unit to maintain a registration with the currently-used base station based on the determination in step (f); and;
   (h) registering the vehicle telematics unit with the neighboring base station.

2. The method of claim 1, further comprising the step of determining that the reverse link is not operational using a dragged counter.

3. The method of claim 1, further comprising the step of determining the speed of the vehicle using a global positioning system (GPS) module operated by the vehicle telematics unit.

4. The method of claim 1, further comprising the steps of: determining a geographical position of the vehicle telematics unit; receiving from the currently-used base station a geographical position of the currently-used base station; and determining that the distance between the geographical position of the vehicle telematics unit and the geographical position of the currently-used base station is greater than a predetermined threshold.

5. The method of claim 1, further comprising the step of using a geofence to periodically initiate a determination of whether the reverse link is operational.

6. The method of claim 1, further comprising the step of disabling a most-recently used (MRU) list maintained by the vehicle telematics unit based on step (e).

7. A method of selecting a wireless carrier system using a vehicle telematics unit, comprising the steps of:
   (a) receiving a wireless signal at a vehicle telematics unit from a currently-used base station of a wireless carrier system that includes a geographical position of the currently-used base station;
   (b) sending communications from the vehicle telematics unit to the currently-used base station using a reverse link of a wireless connection between the vehicle telematics unit and the currently-used base station;
   (c) detecting a failure to receive a response to the sent communications at the vehicle telematics unit from the currently-used base station via a forward link of the wireless connection;
   (d) determining the geographical position of a vehicle carrying the vehicle telematics unit using a GPS module located on the vehicle;
   (e) comparing the determined geographical position of the vehicle with the geographical position of the currently-used base station;
   (f) determining that the vehicle is located beyond a predetermined threshold distance from the currently-used base station;
   (g) identifying one or more neighboring base stations;
   (h) determining that the identified neighboring base station is less preferred than the currently-used base station;
   (i) overriding a preference to maintain a registration with the currently-used base station; and
   (j) registering the vehicle telematics unit with the identified neighboring base station based on step (i).

8. The method of claim 7, further comprising the step of detecting the failure in step (c) using a dragged timer, a dragged counter, or both.

9. The method of claim 8, further comprising the step of altering the duration of the dragged timer based on the speed of a vehicle carrying the vehicle telematics unit.

10. The method of claim 9, further comprising the step of determining the speed of the vehicle using a global positioning system (GPS) module operated by the vehicle telematics unit.

11. The method of claim 7, further comprising the step of using a geofence to periodically initiate a determination of whether the reverse link is operational.

12. The method of claim 7, further comprising the step of disabling a most-recently used (MRU) list maintained by the vehicle telematics unit.

* * * * *